United States Patent
Colwell

(10) Patent No.: US 6,474,669 B2
(45) Date of Patent: Nov. 5, 2002

(54) CRANK ASSEMBLY FOR A FULL-SUSPENSION BICYCLE

(76) Inventor: Jason Colwell, Caltech 253-37, 1200 E. California Bl., Pasadena, CA (US) 91125

(*) Notice: Subject to any disclaimer, the term of this patent is extended or adjusted under 35 U.S.C. 154(b) by 0 days.

(21) Appl. No.: 09/825,464

(22) Filed: Apr. 3, 2001

(65) Prior Publication Data

US 2002/0140202 A1 Oct. 3, 2002

(51) Int. Cl.[7] .................................................. B62M 1/06
(52) U.S. Cl. ........................ 280/260; 280/284; 475/349
(58) Field of Search ............................... 280/284, 283, 280/285, 286, 288, 259, 260; 475/331, 349

(56) References Cited

U.S. PATENT DOCUMENTS

| | | | | |
|---|---|---|---|---|
| 354,777 A | * | 12/1886 | Ferris | |
| 468,994 A | * | 2/1892 | Hance | |
| 531,918 A | * | 1/1895 | Forrest | |
| 571,890 A | * | 11/1896 | Steffens | |
| 1,998,376 A | * | 4/1935 | Lundqvist | |
| 2,392,250 A | * | 1/1946 | Lucas | |
| 4,125,239 A | * | 11/1978 | Berclaz et al. | 248/69 |
| 4,263,820 A | * | 4/1981 | Wetherald | 74/594.2 |
| 4,836,046 A | * | 6/1989 | Chappel | 74/594.2 |
| 6,045,470 A | * | 4/2000 | Wilcox et al. | 474/78 |

* cited by examiner

Primary Examiner—Avraham Lerner

(57) ABSTRACT

A crank assembly for a bicycle uses a chain and a plurality of auxiliary sprockets to achieve high ratios of wheel speed to pedal-rotation speed. The crank assembly is designed for use on a full-suspension bicycle, as the relative motion of the drive sprockets (22) of the transmission is isolated from the motion of the rear suspension arms (18, 20), which form the chain stays of the bicycle, and whose pivot is co-axial with the axle of the pedal cranks (14). Motion of the suspension arms about the pivot induces rotation by an equal angular measure of the drive sprocket of the transmission. So no relative motion of the drive sprocket and suspension arms occurs except that which is induced by the pedal cranks.

1 Claim, 2 Drawing Sheets

CRANK ASSEMBLY FOR A FULL-SUSPENSION BICYCLE

CROSS-REFERENCE TO RELATED APPLICATIONS (not applicable)

STATEMENT REGARDING FEDERALLY SPONSORED RESEARCH AND DEVELOPMENT (not applicable)

BACKGROUND

1. Field of Invention

The invention relates to the drivetrains for full-suspension bicycles.

2. Description of Prior Art

The use of different-sized sprockets between the pedals and the drive wheel of a bicycle to increase the speed of the bicycle has been well-known for many years in the prior art. In the use of rear suspension for the bicycle, many attempts have been made in the prior art to isolate the transmission from the motion of the suspension arm, thus eliminating unwanted pedal-induced motion of the suspension.

Many of the attempts made in the prior art depend on a particular relative angular position of the rear-suspension arm and the rest of the bicycle frame. Thus when this position varies in the course of normal use, the effectiveness of the mechanism in achieving the desired objective is compromised.

U.S. Pat. Nos. 5,205,572 and 5,226,674 to Buell, et al. (1993), and U.S. Pat. No. 5,217,241 to Girvin (1993) are examples of the most basic configuration for a bicycle rear suspension, that of a "swingarm" attached to the main frame by a pivot and providing a circular trajectory of the rear axle relative to the main frame. Usually an attempt is made to minimize the influence of the drivetrain upon the suspension by placing the pivot along or close to the line (when viewed from the side) of the part of the chain under tension. Again such a configuration is susceptible to the changing of the chain position due to the shifting of the chain between sprockets. Such a problem is present also with the double spring assembly design described in U.S. Pat. No. 6,131,934 to Sinclair (2000).

Attempts have been made to reduce this effect by creating a non-circular trajectory for the rear wheel relative to the main frame. This trajectory is usually created by means of a four-bar linkage. U.S. Pat. No. 4,789,174 (1987) and U.S. Pat. No. 5,121,937 (1992) to Lawwill show rear suspension configured in a trapezoidal arrangement, which creates a trajectory of the rear wheel relative to the main frame so as to reduce the action of the pedaling force and resultant chain tension upon the suspension. However, when the chain is shifted between the drive and rear sprockets, the varying position and angle of the part of the chain under tension, makes the influence of the tension upon the suspension unavoidable. Four-bar linkages are also described in U.S. Pat. No. 5,306,036 (1994), U.S. Pat. No. 5,409,249 (1995), and U.S. Pat. No. 5,441,292 (1995) to Busby, U.S. Pat. No. 5,678,837 (1997) to Leitner, and U.S. Pat. No. 6,102,421 to Lawwill, et al. (2000).

A different way of achieving a non-circular trajectory of the rear wheel is also described in U.S. Pat. No. 5,509,679 (1996) and U.S. Pat. No. 5,899,480 (1999) to Leitner. Here the trajectory is created by making the shock absorber itself a structural part of one of the members of the linkage. This design has the same disadvantages, described above, as does the four-bar linkage.

A different attempt to isolate the drivetrain from the suspension has been made by placing the entire drivetrain on the pivoting chainstay. This eliminates the influence of the drivetrain upon the suspension, as the relative position of the drive sprockets and rear sprockets is fixed. Such a configuration is described in U.S. Pat. No. 5,474,318 to Castellano (1995), U.S. Pat. No. 5,685,553 to Wilcox, et al. (1997), and U.S. Pat. No. 6,109,636 to Klein (2000). However, such a configuration makes the stiffness of the suspension when the rider is seated different from that when the rider is standing. Such variation in stiffness is actually the aim of some suspension designs, such as U.S. Pat. No. 5,611,557 to Farris, et al. (1997). Such a design uses this variation to reduce the energy lost due to the "bobbing" which occurs when the rider is standing and pedaling hard. Again, such a solution is reached at the cost of increased stiffness while standing, which causes fatigue in the rider.

Other inventions involve an eccentric crank mechanism. This causes compression of the suspension to effectively lengthen the chainstay to counterbalance the pedaling force of the rider. This is described in U.S. Pat. No. 5,553,881 (1996) and U.S. Pat. No. 5,628,524 (1997) to Klassen, et al., and U.S. Pat. No. 6,099,010 to Busby (2000). This configuration suffers from the fact that the pedaling force to be balanced varies, because of the changing terrain, because of the natural variation in applied force during the pedal stroke, and because the effective force exerted by the drivetrain upon the suspension varies with the shifting of the chain between sprockets.

Another patent, U.S. Pat. No. 5,725,227 to Mayer (1998)—describes a configuration whereby the seat is mounted on an intermediate frame member, between the front portion which includes the steering tube, and the rear portion which includes the drop-outs holding the rear wheel. Such a configuration does not eliminate the problem of variable chain position present with the basic swingarm design.

Some designs make the pivot of the swingarm coaxial with that of the pedal cranks, as does the present invention. This is seen in U.S. Pat. No. 6,149,175 to Fujii (2000). But without the means, as in the present invention, whereby the motion of the swingarm induces like motion of the drive sprocket, this is essentially the same configuration as that where the entire drivetrain is mounted on the swingarm. The same fixed chain length is created, but so is the same variation of stiffness.

SUMMARY

In accordance with the present invention a crank assembly comprises a plurality of gears for operating the drivetrain of a bicycle, centered at and near the axis of the pedal cranks, and the proximal portions of the chainstays, which are free to rotate about the same axis.

OBJECTS AND ADVANTAGES

The object of the present invention is to eliminate the influence of the drivetrain upon the suspension. Though the device involves more gears in the transmission of power than does the usual drivetrain, the efficiency will be at least as good as that of the internal multi-speed rear hub. An additional advantage of the device is that smaller chainrings are required, which increases the clearance between the large chainring and the ground. The increase in clearance and the isolation of the suspension from the drivetrain allow for rear suspension which both has long travel and is power-efficient. As well, the smaller chainrings decrease the difference in radius between adjacent chainrings, allowing easier operation of the front derailleur.

DRAWING FIGURES

FIG. 1 is a view of a crank assembly from the left-hand side.

FIG. 2 is a view of a crank assembly from the right-hand side.

Figure 1:
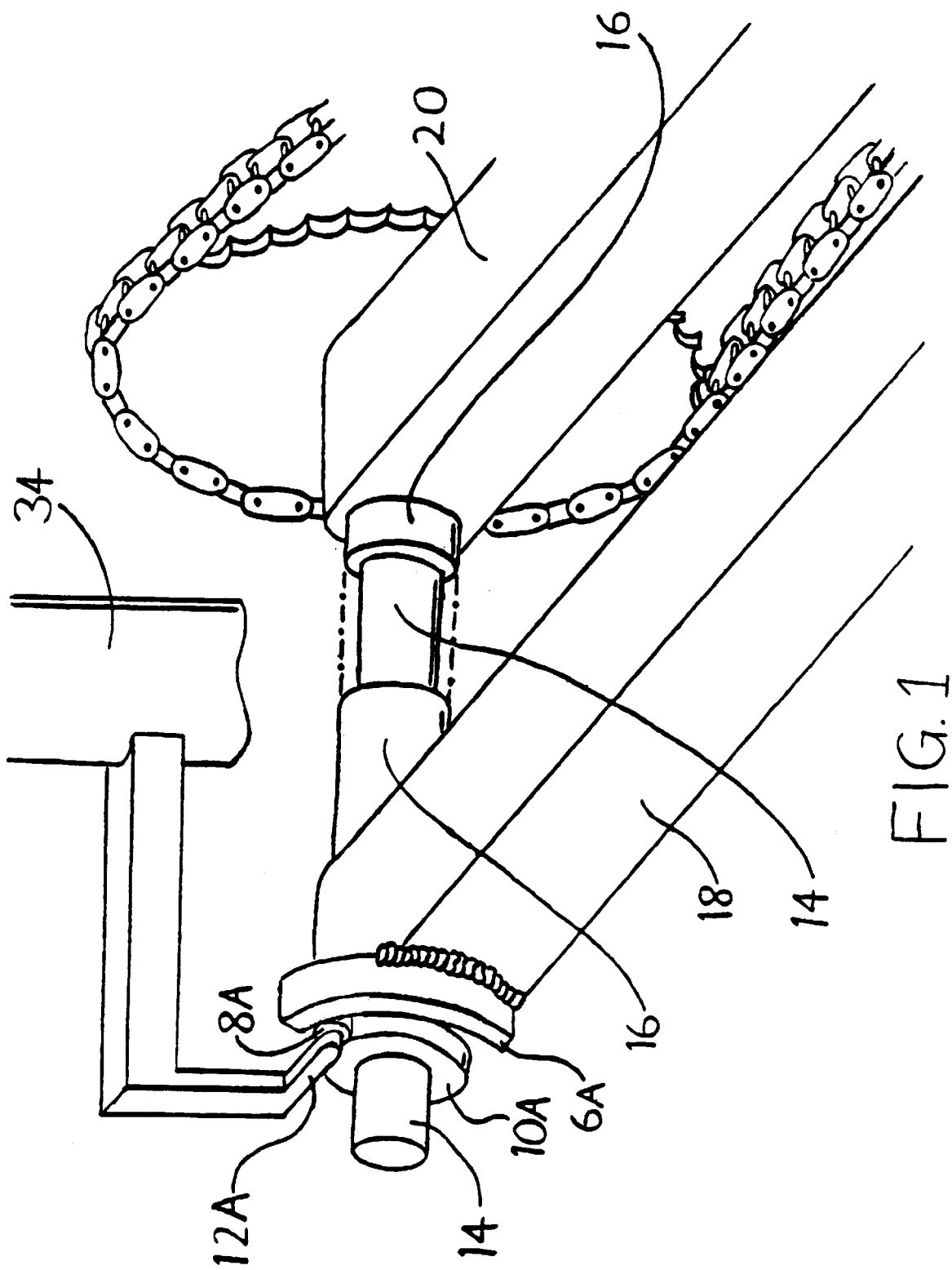
FIGS. 1 and 2 depict an embodiment of a crank assembly, constructed according to claim 1.

REFERENCE NUMERALS IN DRAWINGS 6, 6A: annular gears
8, 8A: gears
10, 10A: gears
12, 12A: links
14: axle of pedal cranks, coupled to these cranks
16: cylindrical axle, coupled to gears 10 and 10A
18: left-hand side chainstay
20: right-hand side chainstay
22: chainring, coupled to annular gear 6
24: pedal crank
26: axle of rear wheel
28: sprocket coupled to rear wheel
30: hub of rear wheel
32: rear wheel
34: seat tube

DESCRIPTION

Figure 2:
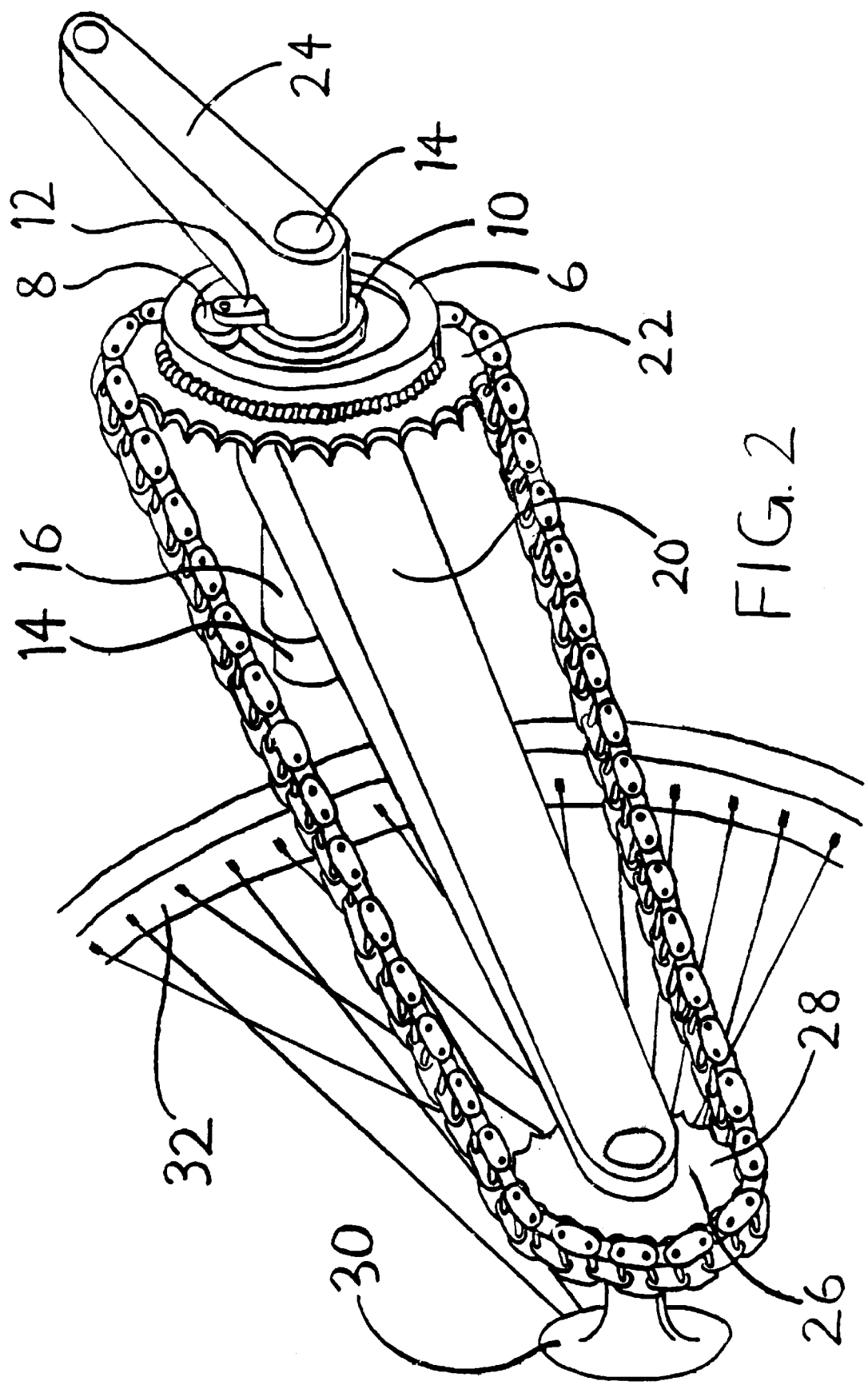

FIGS. 1 and 2—An Embodiment According to claim 1

The means of drivetrain-suspension isolation disclosed herein depends on having (i) A fixed distance between drive sprocket and rear axle to maintain a constant chain tension.

(ii) A drive sprocket whose rotation relative to that of the rear-suspension arm, about their co-axial pivots, is independent of the rotation of the front (the rest of the frame, the fork, the front wheel, etc.) of the bicycle. Denote by "main axis" the common axis of rotation of the pedal cranks, drive sprocket, and rear-suspension arm. Precisely, denoting by $W_{crank}$, $W_{drive}$, and $W_{arm}$, the respective angular velocities about the main axis, with respect to the frame (the main triangle thereof), of the pedal cranks, the drive sprocket, and the rear-suspension arm, which three have co-axial rotation, the invention achieves a relation of $$W_{crank} + W_{arm} = W_{drive}$$

among the variables. Thus, $$W_{drive} - W_{arm} = W_{crank},$$

so that the motion ($W_{drive} - W_{arm}$) of the transmission relative to the rear-suspension arm depends only on the motion of the pedal crank and not on the position of the suspension arm itself.

This relationship between $W_{crank}$, $W_{drive}$, and $W_{arm}$ is achieved using a plurality of gears in the crank mechanism.

FIG. 1 depicts an embodiment of that described in Claim 1, viewed from the left side of the bicycle. FIG. 2 depicts part of the same embodiment, viewed from the right side of the bicycle so that parts 6, 8, 10, and 12 are visible. The gears 6, 8, 10, 6A, 8A, and 10A have teeth on their surfaces of contact, which teeth have been omitted from the figures for simplicity. As the chainstays do not rotate completely around the main axis, only a sector of the annular gear 6A need be embodied. This is seen in FIG. 2 welded to the left-hand side chainstay.

A novel feature of the present invention is the involvement of the motion of the rear-suspension arm, via the movement of gears, in that of the transmission itself. Attempts made in the prior art to achieve the same end as achieved by the present invention generally involve separate suspension system and transmission.

Advantages

The transferal of torque from the rider to the rear axle passes through only two points of engagement of gears in addition to the points of engagement of the usual sprockets, chain, and derailleur of the modem multi-speed bicycle. This will provide an efficiency of torque transfer at least comparable to that of the multi-speed rear hub. As well, the isolation of the pedal torque from the motion of the rear-suspension arm is well-suited to the periodic nature of the torque applied by the cyclist to the drivetrain.

Whereas most rear-suspension systems provide from two to five inches of rear-wheel travel, the present invention would allow for a measure of travel unhampered by the changing position of the suspension arm, and restricted only by the geometry of the rest of the bicycle (such as the position of the seat), allowing for more travel than is found in most suspension systems.

The increased ratio of rotation of pedal cranks to front (drive) sprockets (rather than the usual 1:1) means that the front (drive) sprockets are made smaller than is customary, increasing the ease of operation of the front derailleur and increasing the clearance from the ground of the front sprockets and chain.

The present invention is especially suited to the multiple drive sprockets of the modem mountain bike. Attempts have been made in the prior art to isolate the drivetrain from the rear suspension by placing the suspension-arm pivot axis so that it passes through the point of initial contact (near the top) of the drive sprocket with the chain, thus reducing to zero the torque of the chain upon the suspension arm. However, this has limited success when the point of initial contact changes as the front derailleur shifts the chain between drive sprockets.

Operation

The rider applies force to the pedals, and thus torque to the pedal cranks about the main axis. This causes rotation of the link 12 about the main axis, and thus rotation in the same direction of the gear 8, both about its own pivot at one end of link 12, and about the main axis. The annular gear 6 is then caused to rotate in that direction. It is linked to the drive sprocket, which powers the drivetrain of the bicycle.

The uneven surface of the ground causes the rear-suspension arm to rotate about the main axis, which arm is linked to the annular gear 6A. Through the engagement of 6A with 8A, 8A with 10A, the linking of 10A and 10, the engagement of 10 with 8, and of 8 with 6, the drive sprocket is caused to rotate about the main axis, with an angular velocity equal to that of the suspension arm. Thus the motion of the rear suspension causes no relative motion of the drive sprocket and suspension arm.

CONCLUSION, RAMIFICATIONS, AND SCOPE

Accordingly, this invention eliminates the influence of the drivetrain of a bicycle upon the rear suspension. Additional advantages of the device are provided by the smaller chainrings required. The clearance between the large chainring and the ground is increased, and the difference in radius between adjacent chainrings is decreased, allowing easier operation of the front derailleur.

While it is apparent that the invention herein disclosed is well-calculated to fulfill the objects stated above, it will be appreciated that numerous modifications and embodiments may be derived by those skilled in the art. It is intended that the appended claims cover all such modifications and embodiment as fall within the true spirit and scope of the present invention.

I claim:

1. A bicycle having a frame, at least a rear wheel coupled to the frame via a movable rear-suspension arm, and a drive and suspension system including:

a main sprocket, linked by a chain to a sprocket coupled to a rear axle, the main sprocket rotating about a main axis, a first annular gear (6) rotating about the main axis and having teeth facing inward toward the main axis, a first sun gear (10) rotating about the main axis, a first link (12) pivoting at one end about the main axis, a first planetary gear (8) rotating about another pivot attached to the first link (12) at its other end, a movable suspension arm pivoting about the main axis, a second annular gear (6A), second sun gear (10A), second link (12A), and second planetary gear (8A), having the respective above-named properties of the first annular gear, first sun gear, first link, and first planetary gear, and having:

engagement of the following parts: of the first annular gear (6) and the first planetary gear (8), of the first planetary gear (8) and the first sun gear (10), of the second annular gear (6A) and the second planetary gear (8A), of the second planetary gear (8A) and the second sun gear (10A), a pedal crank being coupled to the first link (12), the first annular gear (6) being coupled to the main sprocket of the transmission, the first and second sun gears (10 and 10A) being coupled to each other, the second annular gear (6A) being coupled to the suspension arm, the second link (12A) being rigidly fixed to the frame.

* * * * *